# 2,876,119

PRINTING INK COMPOSITIONS

Karl Dithmar, Frankfurt am Main, and Erwin Debus, Wiesbaden, Germany, assignors to Deutsche Gold- und Silber-Scheideanstalt vormals Roessler, Frankfurt am Main, Germany No Drawing. Application November 15, 1954
Serial No. 469,063

7 Claims. (Cl. 106—20)

This invention relates to printing inks and more particularly to a new and improved ink composition particularly adapted to the printing of synthetic film composed, for example, of cellulose, cellulose acetate, polyethylene, polyvinyl chloride and the like.

As is known to those skilled in the art the printing of synthetic film by present processes such as the offset, intaglio, rotary, letterpress and the like imposes quite exceptional requirements on the inks. Because the surface of the film is smooth and substantially nonporous a serious problem of ink adhesion exists. Hence the ink used must be such that it will adhere firmly to the film and not wipe off or offset to other material with which it comes in contact. Many of the known inks, particularly the flexographic (aniline) and the gravure (intaglio), are lacking in good film adhering properties, particularly after storage. While this disadvantage can be remedied by inserting protective sheets between the film layers, or by slowing the presses, or by drying the printed film more extensively, etc., such expedients greatly increase the cost of printing synthetic film.

It is the principal object of this invention to provide a new ink composition having superior qualities for printing synthetic film.

It is another object of this invention to provide a novel printing ink composition which will be nonoffsetting on the surface of synthetic film.

The novel composition of this invention comprises a usual ink body containing about 0.5 to 3% by weight of the body of a finely-divided metal oxide as hereinafter defined. As thus composed the ink will adhere firmly to the synthetic film, will be apparently dry as the film leaves the press and will not transfer to other material on contact.

The exceptional and unexpected results achieved by the use of the novel composition of our invention appear to be due primarily to the type and proportion of metal oxide employed therein. The oxide may be of a single metal, including silicon, which, for the purposes of this invention, has the characteristics of other metal oxides, or a mixture of metal oxides. It is however, essential that the metal oxides be pyrogenically produced, i. e., by oxidation or hydrolysis of corresponding metal halides in a high temperature flame and that they contain no particles substantially larger than about 50 millimicrons in equivalent spherical diameter. Suitable processes for the production of such oxides are set forth in Studies on Inorganic Rubber Fillers by Gosta Flemmert, published in Dalarna, Sweden, in 1953 by Dalarnes Tidnings Och Boktryckeri-AB, chapter III.

A preferred metal oxide for the practice of this invention is silica but others, such as alumina, titania, zirconia and zinc oxide alone or in admixture with one another or with silica are quite satisfactory.

The metal oxides are advantageously introduced into the ink body in the form of alcohol or solvent dispersions. Since the ink is in any event diluted with such thinners prior to use no extra work is required. Thus the amount of thinner is selected according to need for any given ink and the metal oxide in the selected proportion is added thereto prior to mixing with the ink.

As we have said, the preferred embodiments of the composition of this invention are those comprising lithographic, letterpress, gravure and flexographic ink bodies. In the following examples are set forth representative formulations of such embodiments.

Example 1

A yellow aniline (flexographic) ink composition was prepared according to this invention as follows:

| | Parts by weight |
|---|---:|
| Auramine conc. (Schultz Dye Tables, 7 ed., No. 752) | 600 |
| Tannin X flakes | 1200 |
| Denatured alcohol | 9000 |
| Solvent GC (BASF) | 1000 |
| Colloidal silica (Aerosil) | 236 |

This ink was used in an offset printing press to print cellophane film. The ink deposited evenly on the film, dried almost instantly and was completely free from offset.

Example 2

A blue flexographic ink of this invention had the following composition.

| | Parts by weight |
|---|---:|
| Victoria Blue extra conc. (Schultz Dye Tables, No. 822) | 800 |
| Tannin X flakes | 800 |
| Solvent GC (BASF) | 1000 |
| Colloidal silica, 20% dispersion in alcohol | 1160 |

This ink functioned equivalently to that of Example 1.

In gravure (intaglio) printing processes, the disadvantage of ink transfer is also encountered in both flat and rotary printing. Intaglio inks, depending on intended use, contain toluene, xylene and/or benzene, frequently in addition to small amounts of oil of turpentine as solvent. In addition to these volatile raw materials, the following are used to prepare the varnish:

Asphalt
Dammar resin
Magnesia
Aluminum hydroxide
Waxes
Chalk
Resinates, etc.

Colorants used include some coal-tar dyes in the form of lacquers, carbon black, chrome yellow or other mineral pigments, etc. Intaglio inks are thus of quite different composition from aniline offset inks. According to the invention, these intaglio printing inks are provided with added finely-divided metal oxides so as to eliminate the disadvantage of transfer of the ink. For this purpose, it is advantageous to employ dispersions of these oxides in the usual solvents for fabrication of inks.

The following examples illustrate the approximate composition of intaglio inks according to the invention.

Example 3

Red intaglio ink 30 kg. synthetic resin varnish, asphalt, dammar resin or Beckacite varnish, depending on purpose of ink
5 kg. Lithol Rubine BK (Schultz Dye Tables, 7th ed., No. 194)
10 kg. aluminum hydroxide
2 kg. precipitated chalk
10 kg. toluene or xylene
1 kg. silica

Example 4

Blue intaglio ink 20 kg. synthetic resin varnish, asphalt, dammar resin or Beckacite varnish, depending on purpose of ink
15 kg. Milori Blue (Schultz Dye Tables, 7th ed., No. 1436)
12 kg. aluminum hydroxide
2 kg. precipitated chalk
10 kg. toluene or xylene
7 kg. of 15% dispersion of silica in toluene or xylene Inks thus prepared gave completely satisfactory results on synthetic films and showed substantially no offset whereas inks composed without the silica gave considerable trouble from offset.

Having described our invention, we claim:

1. A new ink composition comprising ink body and 0.5–3% by weight of the body of finely-divided metal oxide produced pyrogenically and having substantially no particles larger than about 50 millimicrons in equivalent spherical diameter.

2. A new composition comprising ink selected from the group consisting of lithographic, letterpress, gravure and flexographic inks having dispersed therein 0.5–3% by weight thereof of finely-divided metal oxide selected from the group consisting of silica, alumina, titania, zirconia and zinc oxide and mixtures thereof, said metal oxide being the product of oxidation or hydrolysis in a flame of the corresponding metal halide and containing no particles larger than about 50 millimicrons in equivalent spherical diameter.

3. The composition of claim 2 in which the metal oxide is silica.

4. The composition of claim 2 in which the metal oxide is alumina.

5. The composition of claim 2 in which the metal oxide is a mixture of silica and alumina.

6. A new ink composition adapted to the printing of synthetic film comprising ink body consisting of color pigment, vehicle and thinner containing dispersed therein finely-divided metal oxide composed of particles no larger than about 50 millimicrons in equivalent spherical diameter in an amount equal to about 0.5–3% of the weight of ink body.

7. The composition of claim 6 in which the metal oxide has been incorporated into the ink body as a dispersion in thinner.

References Cited in the file of this patent

UNITED STATES PATENTS

| | | |
|---|---|---|
| 1,816,388 | Mittasch et al. | July 28, 1931 |
| 2,291,293 | Curtis | July 28, 1942 |
| 2,347,496 | Muskat et al. | Apr. 25, 1944 |

FOREIGN PATENTS

| | | |
|---|---|---|
| 187,732 | Great Britain | Oct. 30, 1922 |

OTHER REFERENCES

Love et al.: Fiat Final Report 743, Apr. 24, 1946.
Hackh's Chemical Dictionary, published by Blakiston (1944), page 213.